US008205241B2

United States Patent
Lakshminarayanan et al.

(10) Patent No.: US 8,205,241 B2
(45) Date of Patent: Jun. 19, 2012

(54) DETECTION OF HARDWARE-BASED VIRTUAL MACHINE ENVIRONMENT

(75) Inventors: Karthik Lakshminarayanan, Bellevue, WA (US); Kalpesh Patel, Redmond, WA (US); David Robinson, Seattle, WA (US); Tarik Soulami, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1045 days.

(21) Appl. No.: 12/023,022

(22) Filed: Jan. 30, 2008

(65) Prior Publication Data

US 2009/0193496 A1 Jul. 30, 2009

(51) Int. Cl.
*H04L 29/06* (2006.01)
(52) U.S. Cl. ......... 726/1; 726/5; 726/7; 726/26; 726/29; 726/30; 709/224; 703/23
(58) Field of Classification Search .................. None
See application file for complete search history.

(56) References Cited

U.S. PATENT DOCUMENTS

| | | | |
|---|---|---|---|
| 6,397,242 B1 | 5/2002 | Devine et al. | |
| 6,785,886 B1 | 8/2004 | Lim et al. | |
| 7,149,843 B1 | 12/2006 | Agesen et al. | |
| 7,313,512 B1* | 12/2007 | Traut et al. | 703/23 |
| 7,886,038 B2* | 2/2011 | Ferris | 709/223 |
| 2006/0023884 A1 | 2/2006 | McKee | |
| 2006/0026389 A1* | 2/2006 | Dinechin et al. | 712/200 |
| 2006/0085792 A1* | 4/2006 | Traut | 718/100 |
| 2006/0277546 A1 | 12/2006 | Rothman et al. | |
| 2007/0245338 A1* | 10/2007 | Musha | 717/173 |

OTHER PUBLICATIONS

Rutkowska, "Virtualization Detection vs. Blue Pill Detection", Aug. 3, 2007, invisiblething's blog, pp. 4.
Tariq, "Detecting Virtualization", May 14, 2006, pp. 11.
"Black Hat conference: Hardware virtualization rootkits", Aug. 8, 2007, SophosLab blog, pp. 1.
Chapman, et al., "MagiXen: Combining Binary Translation and Virtualization", Hewlett-Packard Development Company, 2007, pp. 15.
Chen, et al., "When Virtual Is Better Than Real", Proceedings of the Eighth Workshop on Hot Topics in Operating Systems, 2001, pp. 6.

\* cited by examiner

*Primary Examiner* — Kaveh Abrishamkar
(74) *Attorney, Agent, or Firm* — Capitol City TechLaw; Richard C. Irving

(57) ABSTRACT

A method and a processing device are provided for detecting a hardware-based virtual machine environment. An execution time of a privileged instruction may be measured and an execution time of a nonprivileged instruction may be measured. The execution time of the privileged instruction may be compared with the execution time of the nonprivileged instruction. When the execution time of the privileged instruction exceeds the execution time of the nonprivileged instruction by at least a threshold or a threshold factor, then a hardware-based virtual machine environment is detected. In some embodiments, a well-known technique for detecting a software-based virtual machine environment may be used in conjunction with a technique for detecting a hardware-based virtual machine environment. A licensing policy of a software product may be accessed and the software product may be prevented from executing when a detected machine environment is in violation of the licensing policy.

20 Claims, 5 Drawing Sheets

DETECTION OF HARDWARE-BASED VIRTUAL MACHINE ENVIRONMENT

BACKGROUND

A number of reliable techniques exist for detecting a software-based virtual machine environment. Examples of software-based virtualization products include Microsoft Virtual Server, Microsoft Virtual PC, and VMWare® (available from VMWare, Inc. of Palo Alto, Calif.). VMWare® has an x86 instruction for a VMWare® virtual processor. However, the x86 instruction is an invalid instruction for a physical processor. Similarly, Microsoft Virtual PC and Microsoft Virtual Server both have a VMCPUID instruction, which is a valid instruction in a virtual machine environment, but is an invalid instruction for a physical processor.

A technique exists for detecting a hardware-based virtual machine environment. However, the technique relies on having certain specific information about a physical processor, such as, for example, a specified frequency of operation of the processor.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided for detecting a hardware-based virtual machine environment. In a virtual machine environment, an execution time of a privileged instruction may be 10 to thousands of times longer than an execution time of a nonprivileged instruction. In a bare (non-virtual) machine environment, the execution time of the privileged instruction may be much shorter than the execution time of the privileged instruction in the virtual machine environment. An execution time of the nonprivileged instruction in a virtual machine environment may be approximately equal to an execution time of the nonprivileged instruction in a bare machine environment. The execution time of the privileged instruction may be measured and compared with the execution time of the nonprivileged instruction. When the execution time of the privileged instruction is greater than the execution time of the nonprivileged instruction by at least a threshold, or a threshold factor, then the hardware-based virtual machine environment is detected.

In a second embodiment consistent with the subject matter of this disclosure, the execution time of the privileged instruction may be measured and accumulated during a predetermined number of executions and the execution time of the nonprivileged instruction may be measured and accumulated during a predetermined number of executions. A hardware-based virtual machine environment may be detected based on comparing the accumulated execution time of the privileged instruction with the accumulated execution time of the nonprivileged instruction.

In a third embodiment consistent with the subject matter of this disclosure, execution of the privileged instruction may be interleaved with execution of the nonprivileged instruction, such that execution of the privileged instruction may occur followed by execution of the nonprivileged instruction a predetermined number of times. Execution times of the privileged instruction and the nonprivileged instruction may be measured and accumulated. A hardware-based virtual machine environment may be detected based on comparing the accumulated execution times of the privileged instruction with the accumulated execution times of the nonprivileged instruction.

In a fourth embodiment consistent with subject matter of this disclosure, a well-known technique for detecting a software-based virtual machine environment may be performed as well as a technique for detecting a hardware-based virtual machine environment. A licensing policy for a software product may be accessed and a determination may be made regarding whether a machine environment violates the licensing policy. If the machine environment is detected to be in violation of the licensing policy, then the software product may be prevented from being activated or executed. In some embodiments, the software product may be permitted to execute only with limited functionality when the machine environment is detected to be in violation of the licensing policy.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
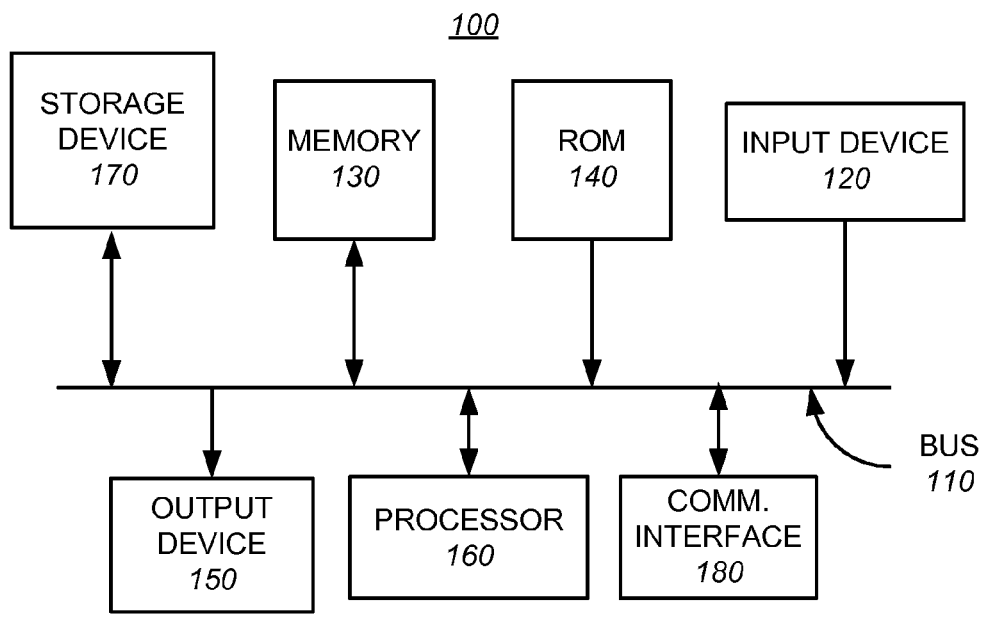
FIG. 1 illustrates a functional block diagram of an exemplary processing device, which may implement embodiments consistent with subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a processing device for heuristically detecting a hardware-based virtual machine environment. The hardware-based virtual machine environment may be detected based on comparing an amount of time to execute a privileged instruction with an amount of time to execute a nonprivileged instruction.

The privileged instruction may be an instruction which includes a reference to a system register, while the nonprivileged instruction may be an instruction which does not include a reference to a system register. Execution time of the privileged instruction in a privileged state (such as, for example, kernel mode, with interrupts disabled or with an interrupt request level (IRQL) set sufficiently high such that an interrupt may not occur during the process) may be nearly the same as an execution time of a non-privileged instruction in the privileged state. In a hardware-based virtual machine environment, hardware may treat the privileged instruction differently as compared with the nonprivileged instruction. As a result, in the hardware-based virtual machine environment, the execution time of the privileged instruction may be much longer than the execution time of the non-privileged instruction.

A hypervisor may be software, with or without assistance of hardware, which may abstract hardware, such that one or more virtual machines may execute on a processing device. The hypervisor may create an environment, such that each of the one or more virtual machines may execute as if running on real hardware. Execution of the privileged instruction in a virtual machine environment may cause a trap to the hypervisor, or may cause hardware assisting the hypervisor to perform specific operations. As a result, in the virtual machine environment, execution of the privileged instruction, such as, for example, an instruction for moving a content of a general-purpose register (for example, a EAX register on an Intel processor or another general purpose register) to a system register (for example, a CR3 register on an Intel processor or another system register) may take an amount of time approximately 10 times to thousands of times longer than an instruction for moving a content of a general-purpose register (for example, a EBX register on an Intel processor or another general-purpose register) to a second general-purpose register (for example, the EAX register on an Intel processor or another general-purpose register). Such a difference in execution time of the privileged instruction as compared with execution time of the nonprivileged instruction may indicate existence of a hardware-based virtual machine environment. To more accurately measure the execution time of the privileged instruction and the execution time of the non-privileged instruction, the privileged instruction and the non-privileged instruction may be executed in kernel mode, with interrupts disabled or with an interrupt request level (IRQL) set sufficiently high such that an interrupt may not occur during the process.

Although the above describes instructions using registers on an Intel processor, in other embodiments, other registers on other types of processors may be employed to execute a privileged instruction and a nonprivileged instruction.

In some embodiments consistent with the subject matter of this disclosure, an amount of time may be measured and accumulated for executing the privileged instruction a predetermined number of times and an amount of time may be measured and accumulated for executing the nonprivileged instruction the predetermined number of times. The accumulated amount of time for executing the privileged instruction may be compared with the accumulated amount of time for executing the nonprivileged instruction in order to detect a hardware-based virtual machine environment. In other embodiments consistent with the subject matter of this disclosure, the privileged instruction and the nonprivileged instruction may be executed the predetermined number of times, in an interleaved fashion, while accumulating an amount of time for executing the privileged instruction and accumulating an amount of time for executing the nonprivileged instruction.

Occasionally, an amount of time for executing the nonprivileged instruction may be unusually long. Therefore, in some embodiments consistent with the subject matter of this disclosure, a check may be performed to determine whether an amount of time, or an amount of cycles, for executing the nonprivileged instruction is beyond a predetermined amount. As mentioned previously, the check may be performed while executing in kernel mode, with interrupts disabled or with an interrupt request level (IRQL) set sufficiently high such that an interrupt may not occur during the check in order to more accurately measure instruction execution times. If the amount of time, or the amount of cycles, for executing the nonprivileged instruction is beyond the predetermined amount, the amount of time, or the amount of cycles, for executing the nonprivileged instruction may be discarded and the nonprivileged instruction may be executed again and an amount of time, or an amount of cycles, for executing the nonprivileged instruction again may be determined.

Some software products may be licensed for execution only in a virtual machine environment, or for execution only in a bare machine environment. The above-mentioned methods may be used to detect a hardware-based virtual machine environment, while other techniques may be used to detect a software-based virtual machine environment. When a virtual machine environment is detected in violation of a licensing policy for a software product, execution or activation of the software product may be prevented. In some embodiments, instead of preventing the execution or the activation of the software product, only a limited set of features of the software product may be functional.

Exemplary Processing Device

FIG. 1 is a functional block diagram of an exemplary processing device 100, which may be used to implement embodiments consistent with the subject matter of this disclosure. Processing device 100 may be a desktop personal computer (PC), a laptop PC, a handheld processing device, or other processing device. Processing device 100 may include a bus 110, an input device 120, a memory 130, a read only memory (ROM) 140, an output device 150, a processor 160, a storage device 170, and a communication interface 180. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include compact disc (CD), digital video disc (DVD), a magnetic medium, or other type of storage device for storing data and/or instructions for processor 160.

Input device 120 may include a keyboard or other input device. Output device 150 may include one or more conventional mechanisms that output information, including one or more display monitors, or other output devices. Communication interface 180 may include a transceiver for communicating via one or more networks via a wired, wireless, fiber optic, or other connection.

Processing device 100 may perform such functions in response to processor 160 executing sequences of instructions contained in a tangible machine-readable medium, such as, for example, memory 130, ROM 140, storage device 170 or other medium. Such instructions may be read into memory 130 from another machine-readable medium or from a separate device via communication interface 180.

Exemplary Operating Environment

Figure 2:
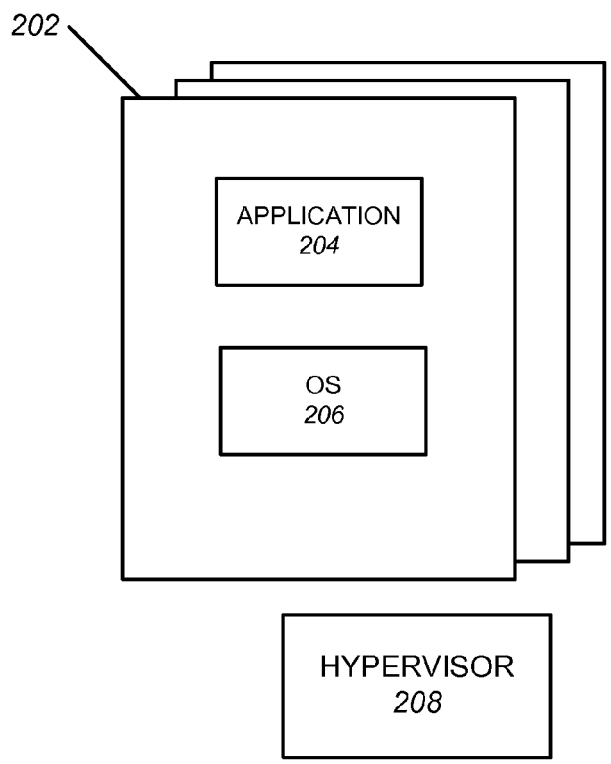
FIG. 2 illustrates an exemplary operating environment for embodiments consistent with the subject matter of this disclosure.

FIG. 2 illustrates an exemplary operating environment of processing device 100. The operating environment may include one or more virtual machine environments 202 and a hypervisor 208. Each of one or more virtual machine environments 202 may include one or more applications 204 and an operating system 206. Hypervisor 208 may be a virtualization platform that executes directly on hardware of processing device 100 and manages one or more virtual machine environments 202. The exemplary operating environment further may include a bare machine, or real hardware, which may execute an operating system and applications in a bare (or non-virtual) machine environment.

Exemplary Processes

Figure 3:
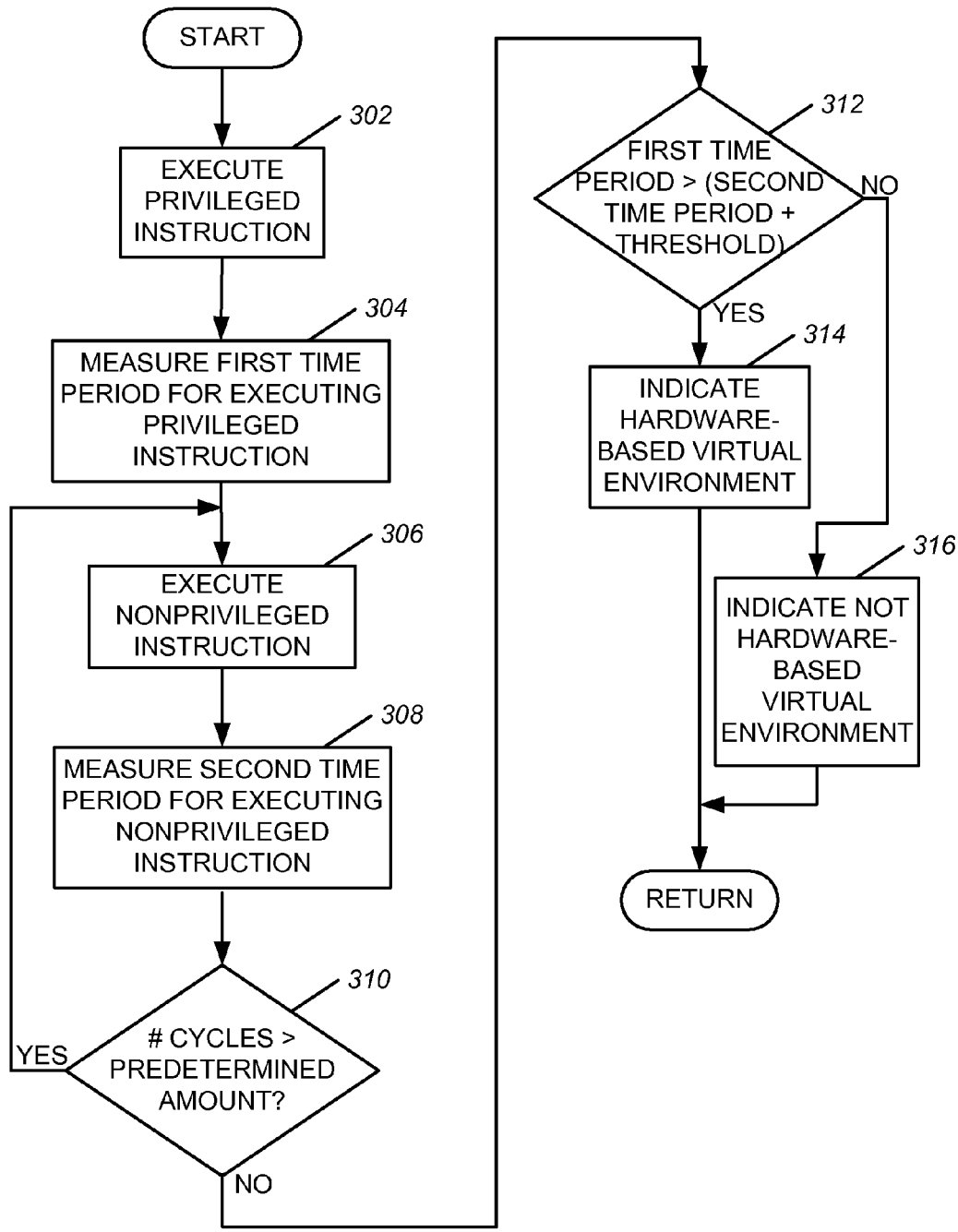
FIG. 3 is a flowchart illustrating an exemplary process in a first embodiment consistent with the subject matter of this disclosure.

FIG. 3 is a flowchart illustrating an exemplary process for detecting a hardware-based virtual machine environment in an embodiment consistent with the subject matter of this disclosure. The process may be executed in a kernel mode, with interrupts disabled or with an interrupt request level (IRQL) set sufficiently high such that an interrupt may not occur during the process.

The process may begin with a processing device, such as, for example, processing device 100, or another processing device, executing a privileged instruction (act 302). In one embodiment, the privileged instruction may be an instruction to move a content of a general-purpose register, such as, for example, a EAX register to a system register, such as, for example, a CR3 register. Of course, in other embodiments, another privileged instruction may be executed.

The processing device may measure a first time period for executing the privileged instruction (act 304). In some embodiments, this may be performed by saving a value of a real time clock prior to execution of the privileged instruction and comparing the saved value of the real time clock with a value of the real time clock after execution of the privileged instruction.

Next, the processing device may execute a nonprivileged instruction, which may not use a system register (act 306). An example of the nonprivileged instruction may include an instruction to move a content of a general-purpose register, such as, for example, a EBX register, to a second general-purpose register, such as, for example, a EAX register. In other embodiments, other general-purpose registers may be used by the nonprivileged instruction.

The processing device may then the measure a second time period for executing the nonprivileged instruction (act 306). This may be performed by saving a value of the real time clock prior to execution of the nonprivileged instruction and comparing the saved value of the real time clock with a value of the real time clock after execution of the nonprivileged instruction.

Next, the processing device may determine whether a number of cycles for executing the nonprivileged instruction is greater than a predetermined amount of cycles (act 310). If the number of cycles for executing the nonprivileged instruction is greater than the predetermined amount of cycles, then the measured time for executing the nonprivileged instruction may be discarded and acts 306 and 308 may again be performed. Thus, cases in which isolated occurrences of the nonprivileged instruction executing in an unusually long period of time may be ignored. In some embodiments, acts 308 and 310 may not be performed.

If, during act 310, the processing device determines that the number of cycles for executing the nonprivileged instruction is not greater than the predetermined amount of cycles, then the processing device may determine whether the first time period for executing the privileged instruction exceeds the second time period for executing the nonprivileged instruction by at least a threshold, or a threshold factor (act 312). The threshold factor may be 10 times to thousands of times greater than the time period for executing the nonprivileged instruction, or another suitable value. If the time period for executing the privileged instruction exceeds the time period for executing the nonprivileged instruction by at least the threshold, or the threshold factor, then the processing device may indicate detection of a hardware-based virtual environment (act 314) by setting a flag, or by performing another action. Otherwise, the processing device may indicate that a hardware-based virtual environment is not detected (act 316), by clearing a flag, or by performing another action.

Figure 4:
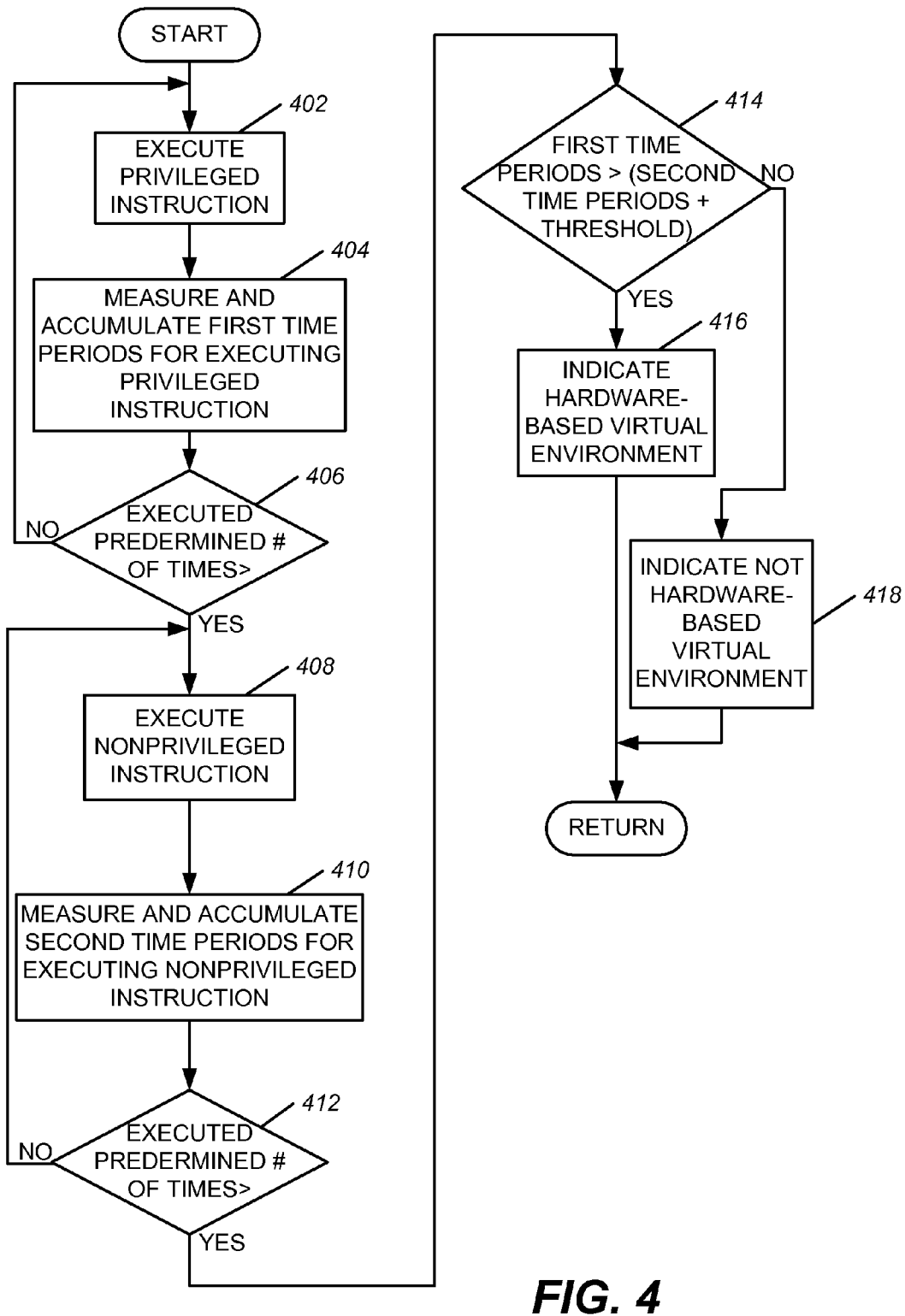
FIG. 4 is a flowchart illustrating an exemplary process in a second embodiment consistent with the subject matter of this disclosure.

FIG. 4 is a flowchart illustrating a second exemplary process for detecting a hardware-based virtual machine environment. The process may be executed in a kernel mode, with interrupts disabled or with an IRQL sufficiently high to prevent an interrupt from occurring during the process.

The process may begin with a processing device, such as, for example, processing device 100, or another processing device, executing a privileged instruction (act 402). The privileged instruction may be an instruction to move a content of a general-purpose register, such as, for example, a EAX register, to a system register, such as, for example, a CR3 register. Of course, in other embodiments, another privileged instruction may be executed.

The processing device may measure and accumulate first time periods for executing the privileged instruction (act 404). In some embodiments, this may be performed by saving a value of a real time clock prior to execution of the privileged instruction and comparing the saved value of the real time clock with a value of the real time clock after execution of the privileged instruction.

The processing device may then determine whether the privileged instruction was executed a predetermined number of times (act 406). If the privileged instruction was not executed the predetermined number of times, then acts 402-406 may be performed again. Otherwise, the processing device and may execute a nonprivileged instruction, which may use one or more general-purpose registers and no system registers (act 408). The processing device may measure and accumulate second time periods for executing the nonprivileged instruction (act 410). The processing device may then determine whether the nonprivileged instruction was executed the predetermined number of times (act 412). If the nonprivileged instruction was not executed the predetermine the number of times, then act 408-412 may be performed again.

If, during act 412, the processing device determines that the nonprivileged instruction was executed the predetermined number of times, then the processing device may determine whether the accumulated first time periods for executing the privileged instruction the predetermined number of times exceeds the accumulated second time periods for executing the nonprivileged instruction the predetermined number of times by at least a threshold, or a threshold factor (act 414). The threshold factor may be 10 times to thousands of times greater than a time for executing the nonprivileged instruction, or another suitable value. If the first accumulated time periods for executing the privileged instruction exceed the second accumulated time periods for executing the nonprivileged instruction by at least the threshold, or the threshold factor, then the processing device may indicate detection of a hardware-based virtual environment (act 416) by setting a flag, or by performing another action. Otherwise, the processing device may indicate that a hardware-based virtual environment is not detected (act 418), by clearing a flag, or by performing another action.

Figure 5:
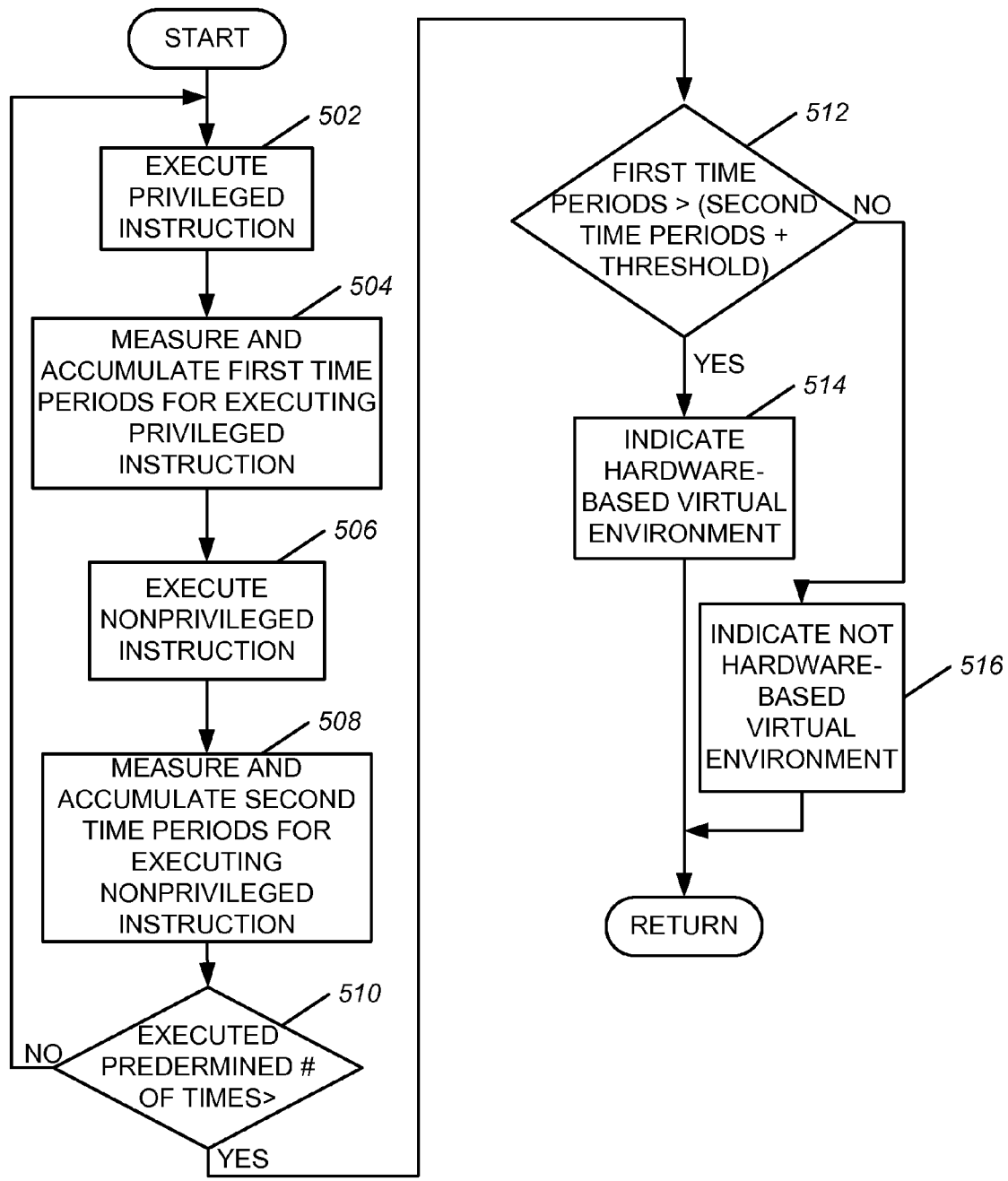
FIG. 5 is a flowchart illustrating an exemplary process in a third embodiment consistent with the subject matter of this disclosure.

FIG. 5 is a flowchart illustrating a third exemplary process for detecting a hardware-based virtual machine environment. The process may be executed in a kernel mode, with interrupts disabled or with an IRQL sufficiently high to prevent an interrupt from occurring during the process, and may interleave execution of a privileged instruction and execution of a nonprivileged instruction.

The process may begin with a processing device, such as, for example, processing device 100, or another processing device, executing a privileged instruction (act 502). In one embodiment, the privileged instruction may be an instruction to move a content of a general-purpose register, such as, for example, a EAX register, to a system register, such as, for example, a CR3 register. Of course, in other embodiments, another privileged instruction may be executed.

The processing device may measure and accumulate first time periods for executing the privileged instruction (act 504). In some embodiments, this may be performed by saving a value of a real time clock prior to execution of the privileged instruction and comparing the saved value of the real time clock with a value of the real time clock after execution of the privileged instruction.

Next, the processing device may execute a nonprivileged instruction, which may not use a system register (act 506). An example of the nonprivileged instruction may include an instruction to move a content of a general-purpose register, such as, for example, a EBX register, to a second general-purpose register, such as, for example, a EAX register. In other embodiments, other general-purpose registers may be used by the nonprivileged instruction.

The processing device may then the measure and accumulate second time periods for executing the nonprivileged instruction (act 508). This may be performed by saving a value of the real time clock prior to execution of the nonprivileged instruction and comparing the saved value of the real time clock with a value of the real time clock after execution of the nonprivileged instruction.

The processing device may then determine whether the privileged instruction and the nonprivileged instruction are executed the predetermined number of times (act 510). If the privileged instruction and the nonprivileged instruction were not executed the predetermined number of times, then acts 502-510 may be performed again.

If the privileged instruction and the nonprivileged instruction were executed the predetermined number of times, then the processing device may determine whether the accumulated first time periods for executing the privileged instruction the predetermined number of times exceeds the accumulated second time periods for executing the nonprivileged instruction the predetermined number of times by at least a threshold, or a threshold factor (act 512). If, during act 512, the processing device determines that the accumulated first time periods for executing the privileged instruction the predetermined number of times exceeds the accumulated second time periods for executing the nonprivileged instruction the predetermined number of times by at least the threshold, or the threshold factor, then the processing device may indicate detection of a hardware-based virtual environment (act 514), by setting a flag, or by performing another action. Otherwise, the processing device may indicate that a hardware-based virtual environment is not detected (act 516), by clearing a flag, or by performing another action. The threshold, or the threshold factor may be 10 times to thousands of times greater than the accumulated time periods for executing the nonprivileged instruction, or another suitable value.

A licensing policy for a software product may indicate permissible conditions for activating or executing the software product. For example, some licensing policies may indicate that a software product may be activated or executed only in a virtual machine environment. Other licensing policies may indicate that a software product may be activated or executed only in a bare machine environment. Some licensing policies may indicate that a software product with a limited functionality may be executed in one of a virtual machine environment or a bare machine environment and may be executed with full functionality in another of the virtual machine environment or the bare machine environment.

Figure 6:
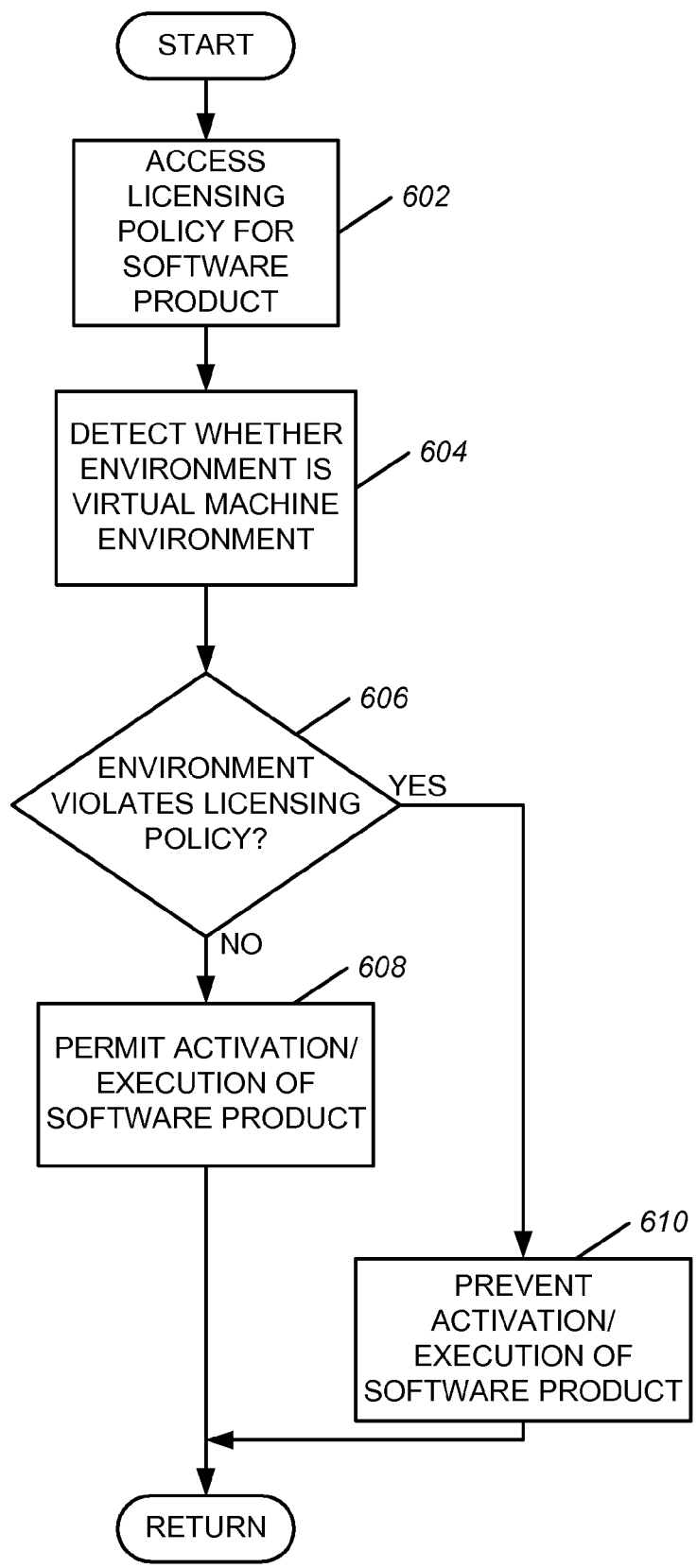
FIG. 6 is a flowchart illustrating an exemplary process for determining whether a machine environment is in violation of a licensing policy for a software product and for preventing or limiting execution of the software product when the machine environment is detected to be in violation of the licensing policy.

FIG. 6 is a flowchart illustrating an exemplary process for determining whether an environment of the processing device violates a licensing policy of a software product. The process may begin by accessing the licensing policy for the software product (act 602). The processing device may then determine whether the environment of the processing device is a virtual machine environment (act 604). The processing device may determine whether the environment is a hardware-based virtual machine environment using, for example, any of the previously discussed techniques. In some embodiments, the processing device may additionally use well-known techniques for detecting whether the environment is a software-based virtual machine environment. An example of a well-known technique for detecting whether the environment is a software-based virtual machine environment may include, for example, executing an instruction which is valid in a virtual machine environment, but is invalid in a bare machine environment, or other well-known techniques.

The processing device may then determine whether the detected environment violates the licensing policy (act 606). If the environment violates the licensing policy, the processing device may prevent activation or execution of the software product (act 610). Alternatively, the processing device may permit activation or execution of the software product, but may only permit the software product to have limited functionality.

If, during act 606, the processing device determines that the detected environment does not violate the licensing policy, then the processing device may permit activation or execution of the software product (act 608). In the alternate embodiment, in which the processing device may permit the software product to have limited functionality when the environment is detected to be in violation of the licensing policy, if the environment is detected to be in conformance with the licensing policy, the processing device may permit the software product to have full functionality.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents define the invention, rather than any specific examples given.

We claim as our invention:

1. A machine-implemented method for detecting a hardware-based virtual machine environment, the machine-implemented method comprising:
   executing a privileged instruction, the privileged instruction being treated in a different manner in a virtual machine environment than in a bare machine environment;
   measuring a first time period for executing the privileged instruction;
   executing a nonprivileged instruction;
   measuring a second time period for executing the nonprivileged instruction;
   detecting the hardware-based virtual machine environment when the first time period is at least a threshold amount greater than the second time period;
   accessing a licensing policy for a software product, the licensing policy indicating whether the software product is permitted to be executed in a virtual machine environment; and
   when the detecting of the hardware-based virtual machine environment detects the hardware-based virtual machine environment and the license policy indicates that the software product is not permitted to be executed in a virtual machine environment, performing one of:
      preventing the software product from executing or activating, or
      preventing the software product from being fully activated.

2. The machine-implemented method of claim 1, wherein:
   the privileged instruction is a move instruction for moving a content of a general purpose register to a system register, and
   the nonprivileged instruction is a move instruction for moving a content of the general purpose register to a second general purpose register.

3. The machine-implemented method of claim 2, wherein the system register is a CR3 register.

4. The machine-implemented method of claim 3, wherein the general purpose register is a EAX register.

5. The machine-implemented method of claim 1, further comprising:
   detecting whether an environment is a software-based virtual machine environment.

6. The machine-implemented method of claim 5, further comprising:
   preventing the software product from executing when the environment is detected to be in violation of the licensing policy.

7. The machine-implemented method of claim 1, further comprising:
   preventing the software product from executing or activating when the detecting of the hardware-based virtual machine environment indicates a violation of the licensing policy.

8. A processing device comprising:
   at least one processor; and
   a memory connected to the at least one processor, the memory including instructions for performing a method comprising:
      executing, in a kernel mode, a privileged instruction, the privileged instruction being treated in a different manner in a virtual machine environment than in a bare machine environment,
      executing, in the kernel mode, a nonprivileged instruction,
      detecting whether an environment is a hardware-based virtual machine environment based on comparing an amount of time for executing the privileged instruction with an amount of time for executing the nonprivileged instruction,
      accessing a licensing policy for a software product, the licensing policy indicating whether the software product is permitted to be executed in a virtual machine environment; and
      when the environment is detected as being the hardware-based virtual machine environment and the licensing policy indicates that the software product is not permitted to be executed in the virtual machine environment, performing one of:
      preventing the software product from executing or activating, or
      preventing the software product from being fully activated.

9. The processing device of claim 8, wherein the method further comprises:
   executing, in the kernel mode, the privileged instruction a predetermined number of times,
   executing, in the kernel mode, the nonprivileged instruction the predetermined number of times, and
   detecting whether the environment is the hardware-based virtual machine environment based on comparing an amount of time for executing the privileged instruction the predetermined number of times with an amount of time for executing the nonprivileged instruction the predetermined number of times.

10. The processing device of claim 8, wherein execution of the privileged instruction causes a trap to a hypervisor.

11. The processing device of claim 8, wherein the method further comprises:
   discarding the amount of time for executing the nonprivileged instruction when a number of cycles for executing the nonprivileged instruction is greater than a predetermined number of cycles.

12. The processing device of claim 8, wherein the method further comprises:
   executing, in the kernel mode, the privileged instruction and the nonprivileged instruction a predetermined number of times,
   measuring and accumulating an amount of time for executing the privileged instruction each of the predetermined number of times,
   measuring and accumulating an amount of time for executing the nonprivileged instruction each of the predetermined number of times, and
   detecting whether the environment is the hardware-based virtual machine environment based on comparing the accumulated amounts of time for executing the privileged instruction with the accumulated amounts of time for executing the nonprivileged instruction.

13. The processing device of claim 8, wherein the method further comprises:
    detecting whether the environment is a software-based virtual machine environment.

14. The processing device of claim 13, wherein the method further comprises:
    preventing the software product from being activated when the environment is detected to be in violation of the licensing policy.

15. A machine-readable storage medium having instructions recorded thereon for at least one processor to execute and perform a method, the method comprising:
    executing, in a kernel mode, a privileged instruction which, in a virtual machine environment, causes execution of a hypervisor or execution of hardware assisting the hypervisor,
    executing, in the kernel mode, a non-privileged instruction which, in a virtual machine environment or in a bare machine environment, does not cause execution of the hypervisor or execution of the hardware assisting the hypervisor,
    detecting whether an environment is a hardware-based virtual machine environment based on comparing an amount of time for executing the privileged instruction with an amount of time for executing the nonprivileged instruction,
    accessing a licensing policy for a software product, the licensing policy indicating whether the software product is permitted to be executed in a virtual machine environment, and
    when the environment is detected as being the hardware-based virtual machine environment and the licensing policy for the software product indicates that the software product is not permitted to be executed in the virtual machine environment, performing one of:
        preventing the software product from executing or activating, or
        preventing the software product from being fully activated,
    wherein the machine-readable storage medium is one of:
        a dynamic storage device,
        a static storage device,
        a compact disc,
        a digital video disc, or
        a magnetic medium.

16. The machine-readable storage medium of claim 15, wherein the detecting whether an environment is a hardware-based virtual machine environment further comprises:
    detecting that the environment is the hardware-based virtual environment when the amount of time for executing the privileged instruction is at least a predetermined threshold factor greater than the amount of time for executing the nonprivileged instruction.

17. The machine-readable storage medium of claim 16, wherein the method further comprises:
    discarding the amount of time for executing the nonprivileged instruction when a number of cycles for executing the nonprivileged instruction is greater than a predetermined number of cycles, and
    re-executing, in the kernel mode, the nonprivileged instruction when the number of cycles for executing the nonprivileged instruction is greater than the predetermined number of cycles.

18. The machine-readable storage medium of claim 15, wherein the method further comprises:
    executing, in the kernel mode, the privileged instruction a predetermined number of times,
    executing, in the kernel mode, the nonprivileged instruction the predetermined number of times, and
    detecting whether the environment is the hardware-based virtual machine environment based on comparing an amount of time for executing the privileged instruction the predetermined number of times with an amount of time for executing the nonprivileged instruction the predetermined number of times.

19. The machine-readable storage medium of claim 15, wherein the method further comprises:
    preventing the software product from being fully activated when the environment is detected to be in violation of the licensing policy.

20. The machine-readable storage medium of claim 15, wherein the method further comprises:
    detecting whether the environment is a software-based virtual machine environment, and
    preventing the software product from being fully functional when the environment is detected to be in violation of the licensing policy.

* * * * *